May 19, 1925.  
J. J. BOSSHARD  
VALVE  
Filed April 25, 1924  
1,537,933
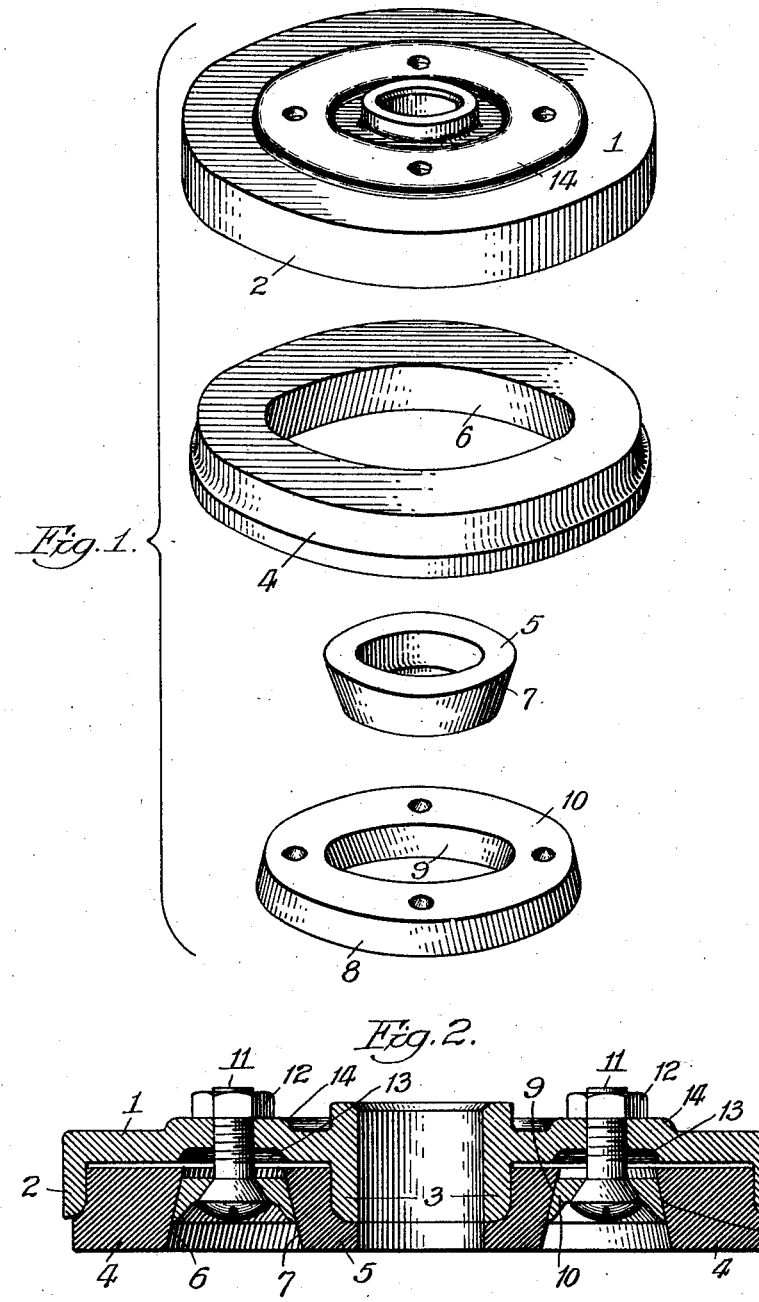
Inventor:  
John J. Bosshard,  
by Wallace R. Lane.  
Atty.

Patented May 19, 1925.

1,537,933

UNITED STATES PATENT OFFICE.

JOHN J. BOSSHARD, OF CHICAGO, ILLINOIS, ASSIGNOR TO THE HILL PUMP VALVE COMPANY, OF CHICAGO, ILLINOIS, A CORPORATION OF ILLINOIS.

VALVE.

Application filed April 25, 1924. Serial No. 708,868.

*To all whom it may concern:*

Be it known that I, JOHN J. BOSSHARD, a citizen of the United States, residing at Chicago, Illinois, have invented a new and useful Valve, of which the following is a specification.

My invention relates to improvements in valves such as are commonly used in pumps and have a reciprocating movement in the pump cylinder. The present improvements relate to the closure member which prevents the fluid from flowing backward during the pumping action and the invention comprises among its objects to improve upon constructions of the type disclosed; to so improve such a construction that a greater strength can be attained for a given weight of material; to so construct a valve of the character stated that if any bending of the facing member or members thereof takes place, the valve will not lose its ability to seat perfectly upon the cooperating seat; and such further objects, advantages and capabilities as will later more fully appear and as are inherent in the mechanism disclosed.

My invention further resides in the combination, construction, and arrangement of parts illustrated in the accompanying drawing, and, while I have shown therein a preferred embodiment, I desire the same to be understood as illustrative only and not as limiting my invention.

In the drawing annexed hereto and forming a part hereof, Fig. 1 is an expanded perspective view of the various parts of my construction, omitting the members whereby they are fastened together, and Fig. 2 is a medial transverse section of the assembled structure.

Referring more in detail to the drawing, numeral 1 designates a grooved annular supporting plate having at its inner and outer margins flanges 2 and 3 for supporting and holding in position the facing members 4 and 5. As is customary in valves of this type, these facing members 4 and 5 are provided with inclined faces 6 and 7 with which the inclined faces 8 and 9 of the holding ring 10 cooperate. This ring 10 is held in place between the facing rings 4 and 5 by means of a plurality of securing members 11. These securing members are preferably threaded into the plate 1 so as to draw the ring 10 tightly to place, thus securing the members 4 and 5 rigidly. Nuts 12 are then fastened upon the bolts 11 and serve as lock nuts to keep them in place. Owing to the large amount of vibration to which such valves are subjected, and the consequent liability for the nuts to become loosened, it is sometimes found desirable to rivet the bolts after the nuts have been turned tightly to place.

The inside or web portion of the plate 1 is hollowed out as shown at 13 and upon the opposite face is formed with a ridge 14. This results in an arch opposite the ring 10 and this arch gives a greater strength for a given amount of material and weight. This also results in being able to secure a greater amount of adjustability of parts.

It is, of course, understood that there may be variations from the specific structure shown and described without departing from the spirit of my invention as set forth in this specification and the appended claims:

Having now described my invention, I claim:

1. In a valve, a pair of annular facing members, a plate having a groove for receiving and holding said facing members, a retaining ring adjustably mounted between said annular members for holding them in the groove and permitting their removal therefrom, said plate being arched over the retaining ring to give a maximum of strength for the material used.

2. In a valve, a supporting plate for receiving and holding facing members, said plate being annular in form and having inner and outer flanges and a web portion between the flanges extending in the opposite direction therefrom, and a reinforcing arch in said web portion.

In witness whereof, I hereunto subscribe my name to this specification.

JOHN J. BOSSHARD.